US010737921B2

(12) United States Patent
Motley et al.

(10) Patent No.: US 10,737,921 B2
(45) Date of Patent: Aug. 11, 2020

(54) HOIST-IT

(71) Applicants: Larry Wayne Motley, Chesapeake, VA (US); Patricia Ann Motley, Chesapeake, VA (US)

(72) Inventors: Larry Wayne Motley, Chesapeake, VA (US); Patricia Ann Motley, Chesapeake, VA (US)

( * ) Notice: Subject to any disclaimer, the term of this patent is extended or adjusted under 35 U.S.C. 154(b) by 106 days.

(21) Appl. No.: 15/920,809

(22) Filed: Mar. 14, 2018

(65) Prior Publication Data

US 2018/0265338 A1 Sep. 20, 2018

Related U.S. Application Data

(60) Provisional application No. 62/471,068, filed on Mar. 14, 2017.

(51) Int. Cl.
*B66F 7/28* (2006.01)
*B66C 19/00* (2006.01)
(Continued)

(52) U.S. Cl.
CPC ................ *B66F 7/28* (2013.01); *B66C 1/107* (2013.01); *B66C 5/025* (2013.01); *B66C 19/00* (2013.01); *B66F 7/10* (2013.01); *B66F 7/12* (2013.01)

(58) Field of Classification Search
None
See application file for complete search history.

(56) References Cited

U.S. PATENT DOCUMENTS 1,825,787 A * 10/1931 Fitch ........................ B66C 17/20 191/36
1,952,238 A 3/1934 Dice
(Continued)

FOREIGN PATENT DOCUMENTS

CA 2480060 A1 * 2/2006 ................ B66F 7/02
CN 108657991 A * 7/2018 ............. B66C 11/04
(Continued)

OTHER PUBLICATIONS

Car Guy Garage, "10 Foot Span 1 Ton Capacity Overhead Bridge Crane System," http://www.carguygarage.com/footspantoncapav.html, (downloaded on Mar. 4, 2016), pp. 1-13.

*Primary Examiner* — Emmanuel M Marcelo
(74) *Attorney, Agent, or Firm* — Birch, Stewart, Kolasch & Birch, LLP

(57) ABSTRACT

A hoist for removing an object to enable an individual to work on the object includes a first substantially vertical support mounted on a floor surface. A second substantially vertical support mounted on the floor surface and being spaced a predetermined distance away from the first substantially vertical support. The first and second substantially vertical supports include an upper surface. A substantially horizontal member extending across the upper surfaces of the first and second substantially vertical supports. A first vertical lift is operatively positioned within the first substantially vertical support. A second vertical lift is operatively positioned within the second substantially vertical support. The first and second vertical lifts selectively raising the member relative to the floor surface. A winch is operatively mounted on the substantially horizontal member for lifting the object relative to the member for enabling an individual to work on the object.

12 Claims, 12 Drawing Sheets

(51) Int. Cl.

| | |
|---|---|
| ***B66F 7/10*** | (2006.01) |
| ***B66C 5/02*** | (2006.01) |
| ***B66F 7/12*** | (2006.01) |
| ***B66C 1/10*** | (2006.01) |

(56) References Cited

U.S. PATENT DOCUMENTS 2,593,635 A * 4/1952 Walker ...................... B66F 7/02 187/219
3,300,186 A * 1/1967 Lee ......................... B66C 19/00 254/334
3,494,492 A 2/1970 Thiermann
4,090,625 A * 5/1978 Walters ................... B66C 23/48 414/743
4,732,186 A * 3/1988 Nishikawa ................ B60S 3/04 134/123
4,763,761 A * 8/1988 McKinsey ................ B66F 7/04 187/207
4,941,645 A * 7/1990 Hall ...................... B62B 3/0637 254/324
5,009,287 A * 4/1991 Starr ......................... B66F 7/04 187/213
5,207,296 A * 5/1993 Beattie ...................... B66F 7/04 187/208
5,263,687 A * 11/1993 Garbiso ................... B60J 11/00 248/327
5,281,077 A 1/1994 Phillips
D378,457 S * 3/1997 Page .............................. D34/28
5,715,958 A * 2/1998 Feider ..................... B66C 1/101 212/273
5,772,183 A * 6/1998 Sears ...................... B66C 5/025 248/333
6,279,685 B1 * 8/2001 Kogan ...................... B66F 7/20 187/203
6,464,208 B1 * 10/2002 Smith .................... A61H 3/008 212/97
6,575,685 B2 6/2003 Baxter, Sr.
8,371,557 B1 * 2/2013 Buck ....................... B65F 1/163 220/262
9,055,738 B1 * 6/2015 Woller ................ A01M 31/006
9,376,296 B2 * 6/2016 Nussbaum ................ B66F 7/28
9,527,707 B1 * 12/2016 Fehringer ................. B66F 7/26
9,821,989 B2 * 11/2017 Uhl ........................... B66F 7/04
2002/0043137 A1 * 4/2002 Yeo ........................... B23B 5/04 82/112
2007/0163982 A1 * 7/2007 Lichinchi .............. B60P 1/5471 212/175
2011/0097187 A1 * 4/2011 Kelley ...................... B66F 7/28 414/814
2011/0155683 A1 * 6/2011 Kim ........................ B66C 1/101 212/307
2012/0090921 A1 * 4/2012 Janz ......................... B66D 1/60 187/216
2012/0138559 A1 6/2012 Huff et al.
2013/0240696 A1 * 9/2013 Black ........................ B66F 7/28 248/226.11
2014/0119866 A1 5/2014 Pruskauer
2015/0144853 A1 * 5/2015 Nussbaum ................ B66F 7/20 254/89 H
2015/0183621 A1 * 7/2015 Koch ...................... B66C 17/20 212/315
2015/0345750 A1 * 12/2015 Oakley ..................... B66F 7/28 362/89
2018/0201490 A1 * 7/2018 Ringler ..................... B66F 7/10
2018/0327235 A1 * 11/2018 McClure ................... B66F 3/36

FOREIGN PATENT DOCUMENTS

DE 91 08 883 U1 9/1991
GB 2 080 235 A 2/1982
GB 2 362 175 A 11/2001
JP 10-279242 A 10/1998
JP 2004-43038 A 2/2004

* cited by examiner

HOIST-IT

CROSS-REFERENCE TO RELATED APPLICATIONS

The present application claims priority to Provisional Patent Application No. 62/471,068 filed Mar. 14, 2017, the entire contents of which are hereby expressly incorporated by reference.

BACKGROUND OF THE INVENTION

Field of the Invention

The present invention is directed to a hoist for lifting an object. More particularly, to a hoist for removing an object to permit an individual to work on the object, such as removing an engine from a vehicle for maintenance work on the engine.

Description of Background Art

To remove and install an engine from a vehicle, such as an automobile or truck, a vehicle lift is known that permits an individual to lift the front and rear of the vehicle. Thereafter, an engine lift is moved into place adjacent to the front of the vehicle and is secured to the engine. After the engine is disengaged from the chassis of the vehicle it is then possible to actuate the engine crane-hoist to actually remove the engine from the vehicle. Normally, it takes two or more individuals to operate the vehicle lift and the engine crane-hoist to remove the engine.

Vehicle lifts and engine lifts are expensive to purchase and to accommodate within a repair facility. For example, the vehicle lift requires a dedicated space for mounting the vehicle lift to the floor in the repair facility. In addition, the engine crane-hoist requires storage space when not in use. Further, the engine crane-hoist requires a space in front of the vehicle for positioning the engine crane-hoist relative to the front of the vehicle when being used for removing an engine.

SUMMARY AND OBJECTS OF THE INVENTION

The present invention has been made to overcome the disadvantages of the prior art. The present invention permits one individual to lift a vehicle, secure the hoist to the engine and thereafter remove the engine from the vehicle.

It is an object of an embodiment of the present invention to provide a hoist for removing an object to enable an individual to work on the object that includes a first substantially vertical support mounted on a floor surface. The first substantially vertical support includes an upper surface. A second substantially vertical support is mounted on the floor surface. The first substantially vertical support and the second substantially vertical support are spaced a predetermined distance relative to each other. The second substantially vertical support includes an upper surface. A substantially horizontal member extends across from the upper surface of the first substantially vertical support to the upper surface of the second substantially vertical support. A first vertical lift is operatively positioned within the first substantially vertical support. A second vertical lift is operatively positioned within the second substantially vertical support. The first vertical lift and the second vertical lift may be activated for selectively raising a member relative to the floor surface. A winch is operatively affixed in a permanent mount on the substantially horizontal member or is moved from side to side then locked into place once positioned for the correct application for lifting the object relative to the member for enabling an individual to work on the object.

According to an embodiment of the present invention, the member is selected from the group consisting of an automobile and a truck and the object is an engine.

According to an embodiment of the present invention, first supports are secured to the first vertical lift for positioning underneath a left side of the automobile or truck and second supports are secured to the second vertical lift for positioning underneath a right side of the automobile or truck for selectively elevating the automobile or truck relative to a ground surface.

According to an embodiment of the present invention, the substantially horizontal member includes a slot extending across a portion of the substantially horizontal member to enable the winch to be moved from one side of the substantially horizontal member to the other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
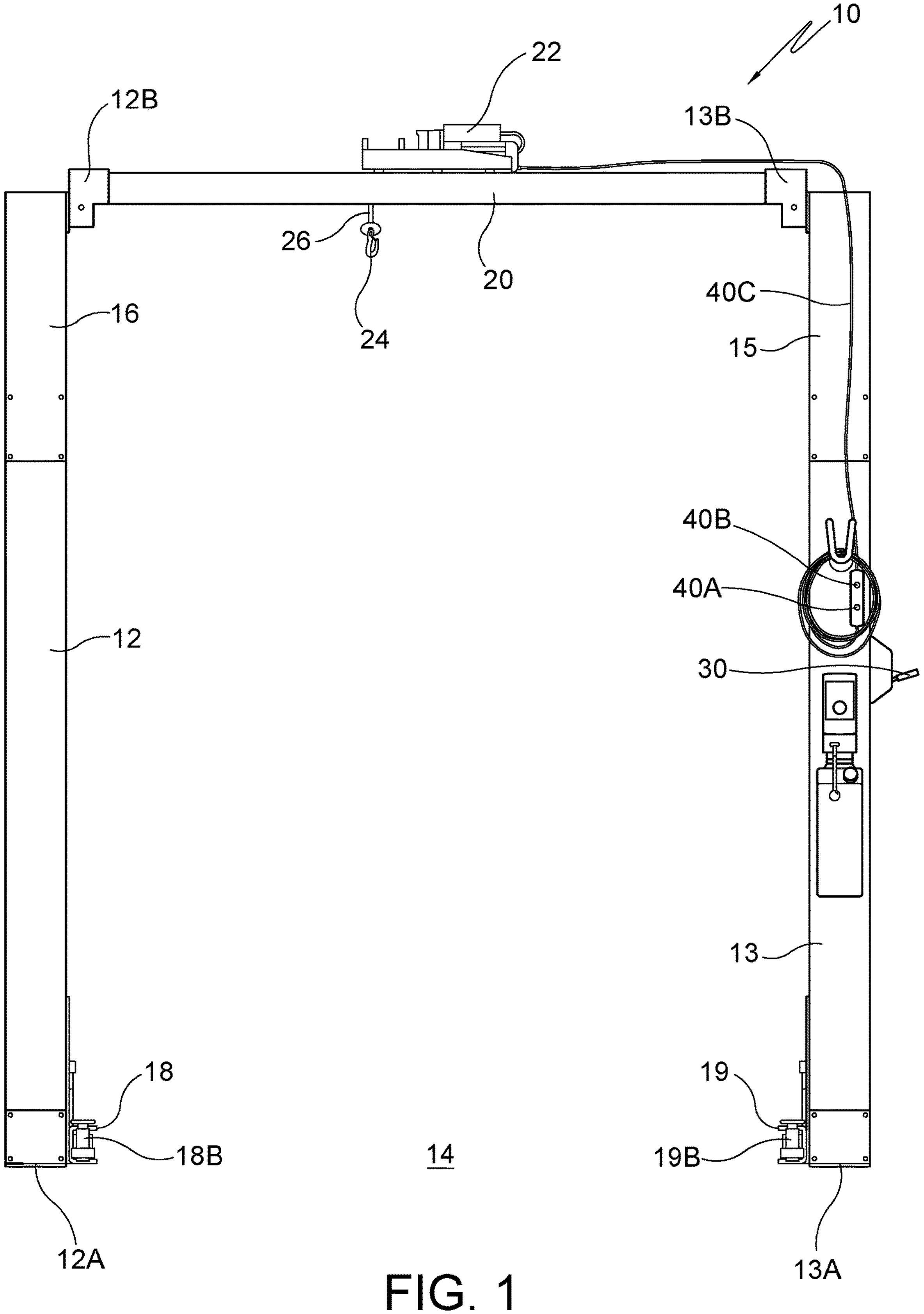
FIG. 1 is a front elevational view of a hoist wherein a single hook is provided for removing an object to permit an individual to work on the object.
Figure 2:
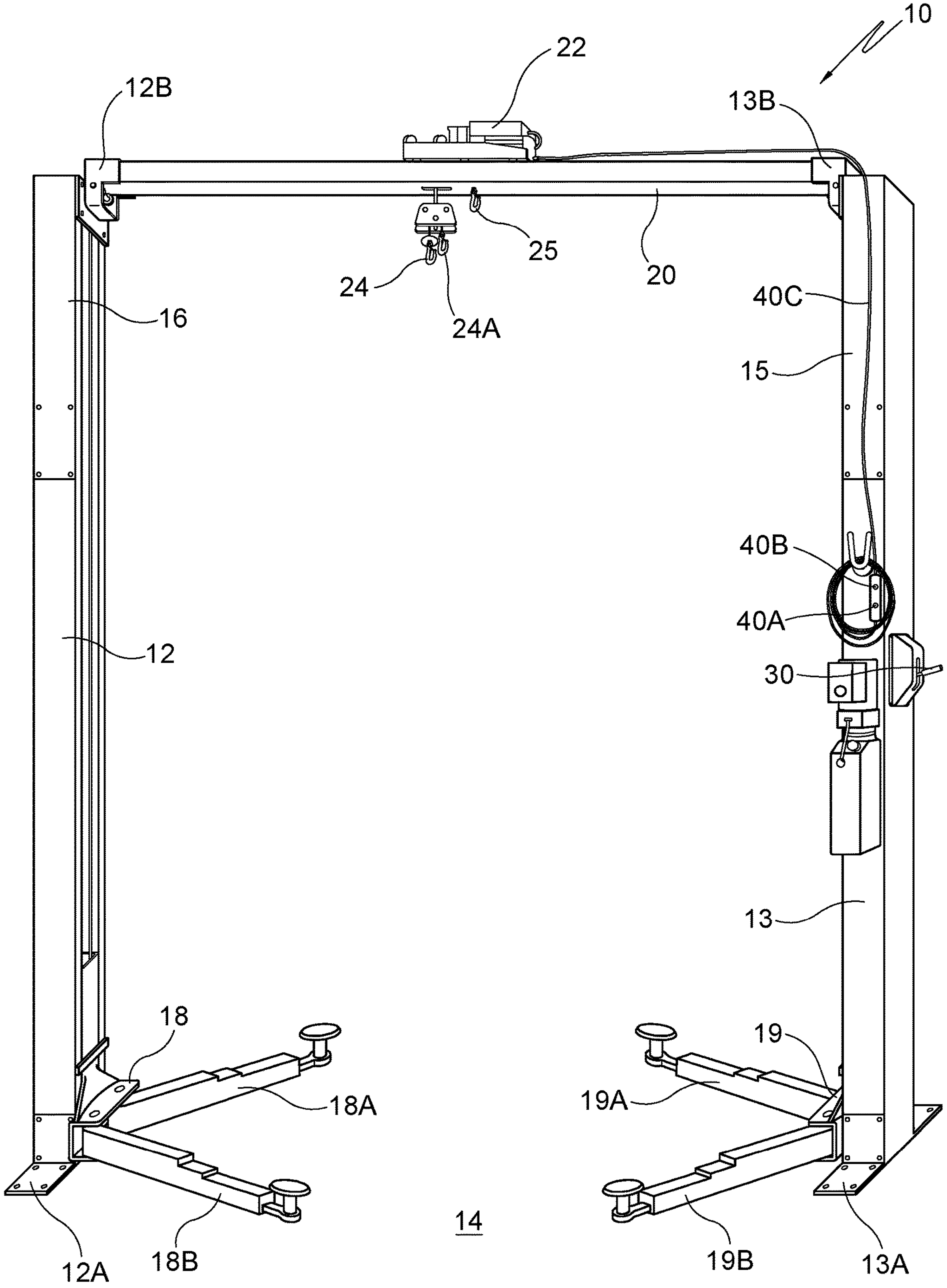
FIG. 2 is a front perspective view of the hoist wherein two hooks are provided for removing an object to permit an individual to work on the object.

As illustrated in FIGS. 1 and 2, a hoist 10 is provided for removing an object to enable an individual to work on the object. A first substantially vertical support 12 includes a flange member 12A for mounting on a floor surface 14. The first substantially vertical support 12 includes an upper surface 16. A second substantially vertical support 13 includes a flange member 13A for mounting on the floor surface 14. The first substantially vertical support 12 and the second substantially vertical support 13 are spaced a predetermined distance relative to each other. The second substantially vertical support 13 includes an upper surface 15. A substantially horizontal member 20 extends across from the upper surface 16 of the first substantially vertical support 12 to the upper surface 15 of the second substantially vertical support 13. The substantially horizontal member 20 is secured to the upper surface of the first substantially vertical support 12 by a flange member 12B. The substantially horizontal member 20 is secured to the upper surface of the second substantially vertical support 13 by a flange member 13B.

Figure 3:
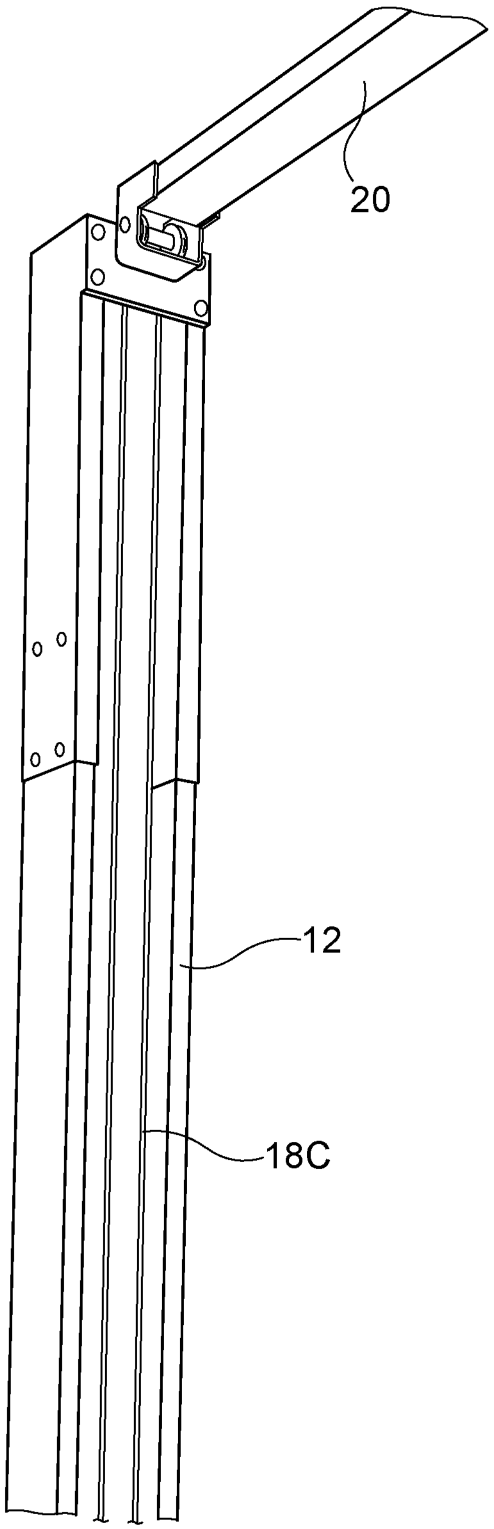
FIG. 3 illustrates a first substantially vertical support including a chain drive positioned within the first substantially vertical support for raising a first vertical lift.

A first vertical lift 18 is operatively positioned within the first substantially vertical support 12. The first vertical lift 18 includes first supports 18A, 18B for positioning underneath a left side of a vehicle, such as an automobile or truck. As illustrated in FIG. 3, the first vertical lift 18 is driven by a chain drive 18C or hydraulically for selectively raising the first vertical lift 18.

Figure 4:
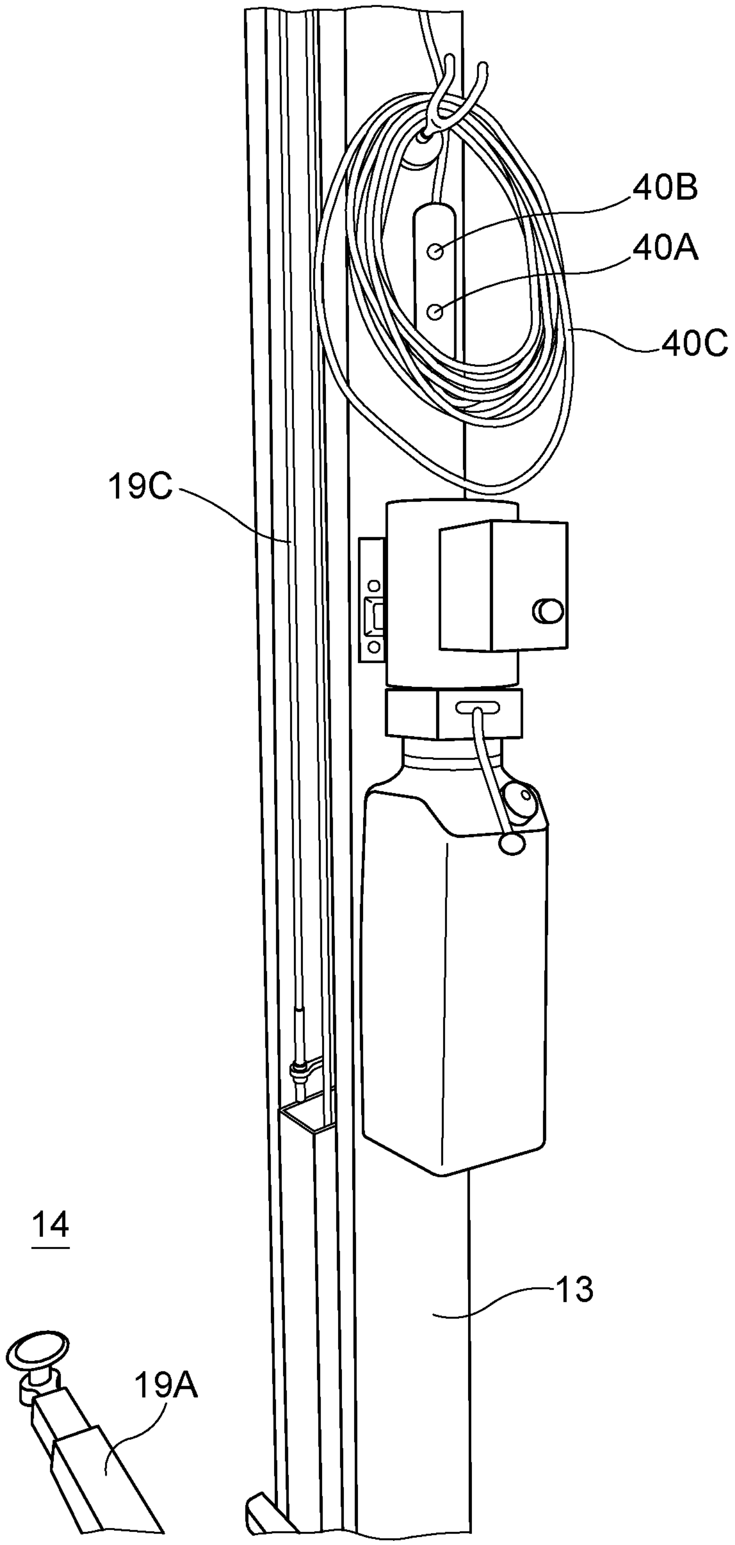
FIG. 4 illustrates a second substantially vertical support including a chain drive positioned within the second substantially vertical support for raising a second vertical lift.

A second vertical lift 19 is operatively positioned within the second substantially vertical support 13. The second vertical lift 19 includes second supports 19A, 19B for positioning underneath a right side of the vehicle. As illustrated in FIG. 4, the second vertical lift 19 is driven by a chain drive or hydraulically for selectively raising the second vertical lift 19.

Figure 9:
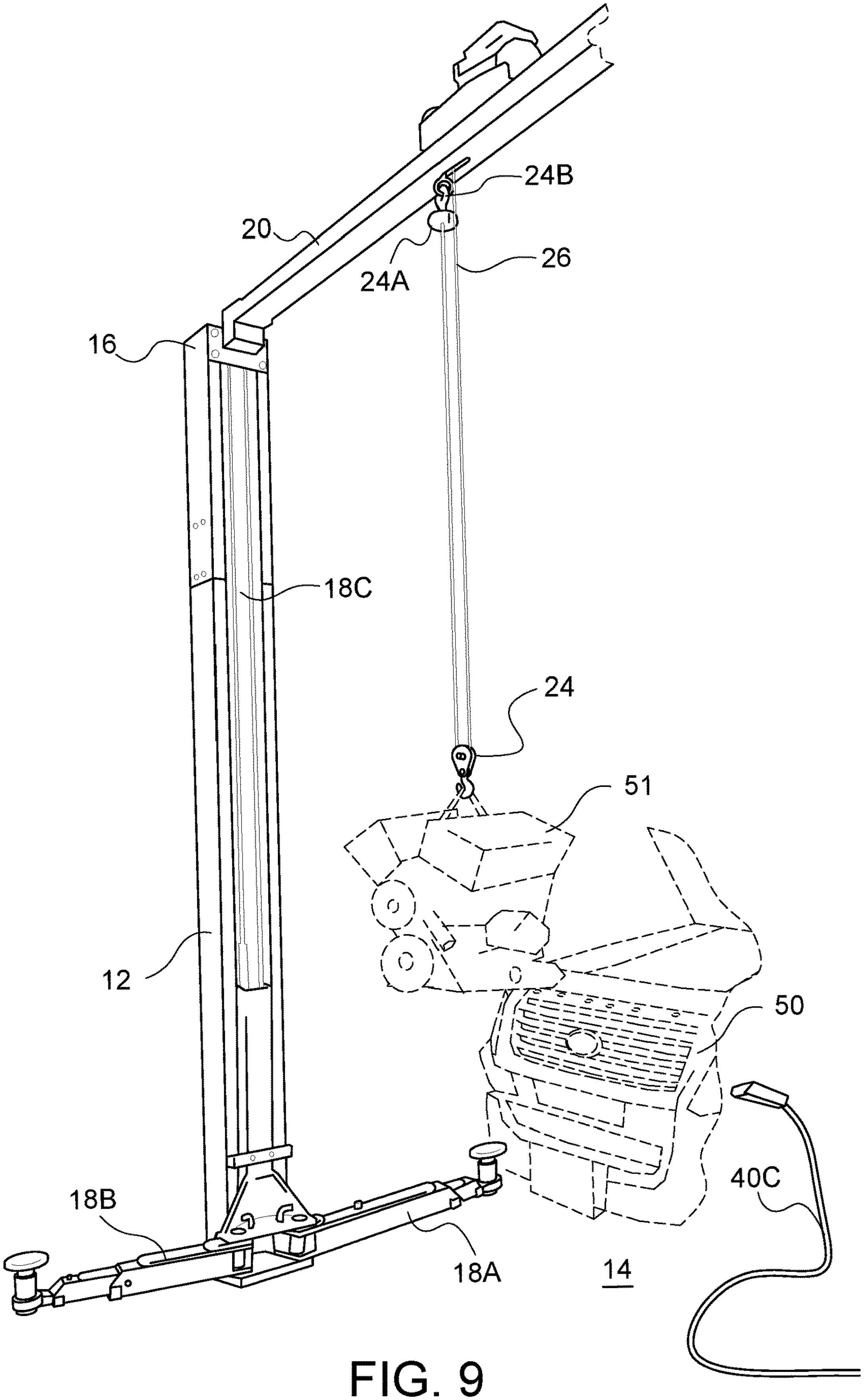
FIG. 9 is a side view of the hoist in use together with a vehicle wherein a hood of the vehicle has been removed and a winch can thereafter remove an engine from the vehicle.
Figure 10:
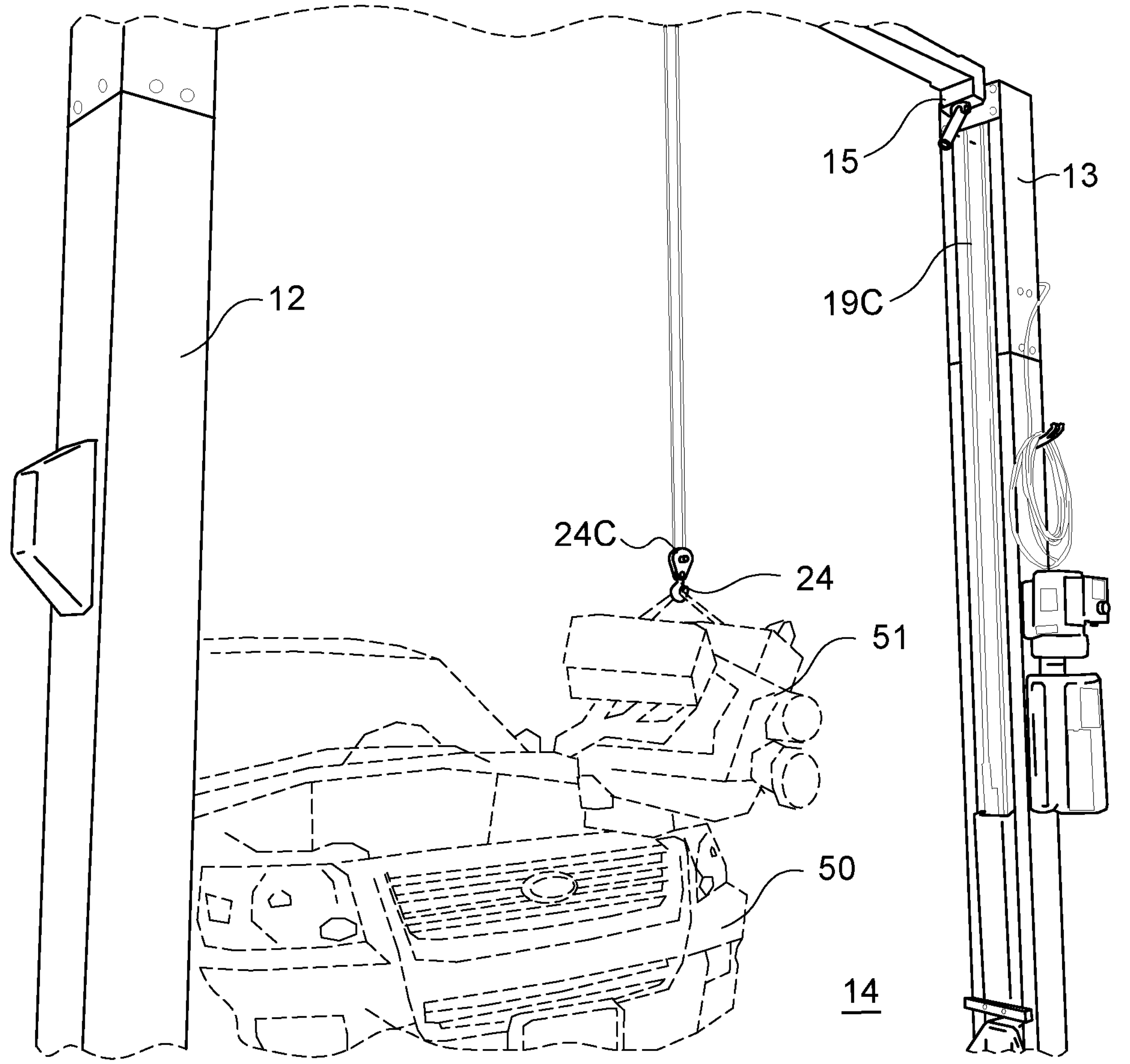
FIG. 10 is a front view of the hoist in use together with the vehicle wherein the hood of the vehicle has been removed and the engine is being lifted from the vehicle by the winch.
Figure 11:
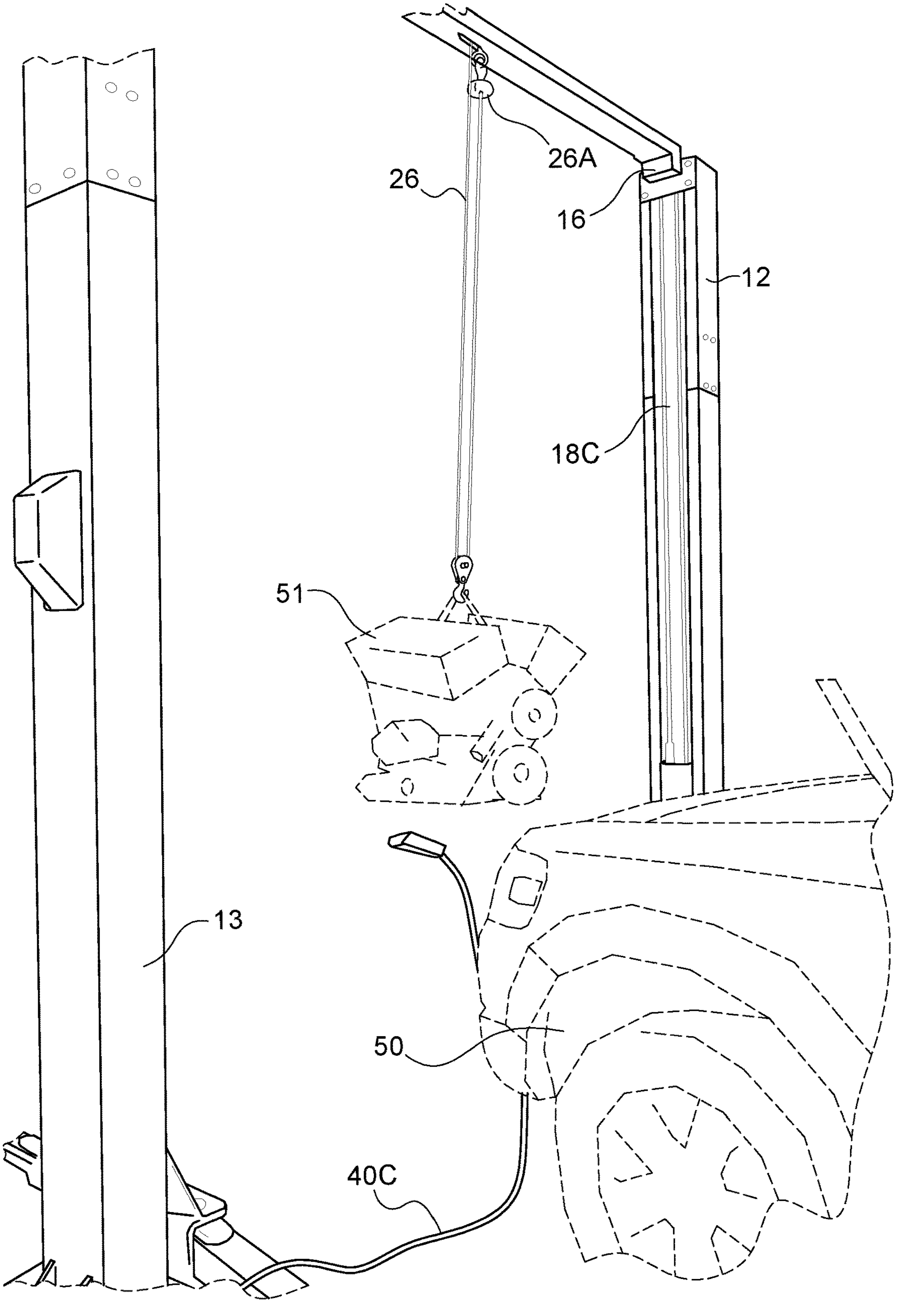
FIG. 11 is a side view of the hoist in use together with the vehicle wherein the hood of the vehicle has been removed and the engine has been removed from the vehicle by the winch.

When the first vertical lift 18 and the second vertical lift 19 are actuated by the lever 30, a vehicle positioned above the first supports 18A, 18B and the second support 19A, 19B is raised to permit an individual to work on an engine. Upon completion of working on the vehicle, such as removing an engine 51 as illustrated in FIGS. 9-11, the lever 30 may be actuated to lower the vehicle to permit the vehicle to be moved away from the lift.

A winch 22 is operatively mounted on the substantially horizontal member 20. As illustrated in FIG. 1, a hook 24 is secured to the winch 22 and by activating a button 40A a connection is made through the cable 40C wherein the hook 24 may be lowered for attaching the hook 24 to an engine to secure the engine. Once the engine is secured, an individual can disconnect the engine from the chassis of the vehicle. Thereafter, the winch 22 is activated by a button 40B to make a connection through a cable 40C to permit the engine to be lifted relative to the vehicle for enabling an individual to remove the engine from the vehicle to work on the engine. The winch 22 includes a standard drum or similar component for coiling a winch rope, lift rope, cable, chain or the like 26 for pulling or hoisting. The winch rope, lift rope, cable, chain or the like 26 may be extended downwardly a predetermined distance from the substantially horizontal member 20 by actuating the button 40A for lowering the winch rope, lift rope, cable, chain or the like 26 for securing to an engine. Thereafter, the button 40B may be actuated for pulling or hoisting the engine upwardly and away from the chassis of the vehicle. An eyelet 25 may be secured to the substantially horizontal member 20 to enable the hook 24 to be fastened to the eyelet 25 to loop the winch rope, lift rope, cable, chain or the like 26 around the engine. In addition, a second hook 24A is secured to the winch rope, lift rope, cable, chain or the like 26 to enable flexibility with regard to securing the winch rope, lift rope, cable, chain or the like 26 to the engine.

As illustrated in FIG. 2, the winch 22 is again operatively mounted on the substantially horizontal member 20. The single hook 24 is secured to the winch 22 and by activating the button 40A a connection is made through the cable 40C wherein the single hook 24 may be lowered for attaching the hook 24 to an engine to secure the engine. Once the engine is secured, an individual can disconnect the engine from the chassis of the vehicle. Thereafter, the winch 22 is activated by the button 40B to make a connection through the cable 40C to permit the engine to be lifted relative to the vehicle for enabling an individual to remove the engine from the vehicle to work on the engine. The winch 22 includes a standard drum or similar component for coiling a winch rope, lift rope, cable, chain or the like 26 for pulling or hoisting. The winch rope, lift rope, cable, chain or the like 26 may be extended downwardly a predetermined distance from the substantially horizontal member 20 by actuating the button 40A for securing to an engine and thereafter for pulling or hoisting the engine upwardly by actuating the button 40B to lift the engine away from the chassis of the vehicle.

As illustrated in FIG. 3, the first substantially vertical support 12 includes a chain drive 18C positioned within the first substantially vertical support 12 for raising a first vertical lift. FIG. 4 illustrates the second substantially vertical support 13 and includes a chain drive 19C positioned within the second substantially vertical support 13 for raising a second vertical lift 19A. In operation, by actuating the handle 30 a motor imparts movement to the chain drives 18C and 19C to raise a vehicle positioned on top of the first and second vertical lifts 18, 19.

Figure 5:
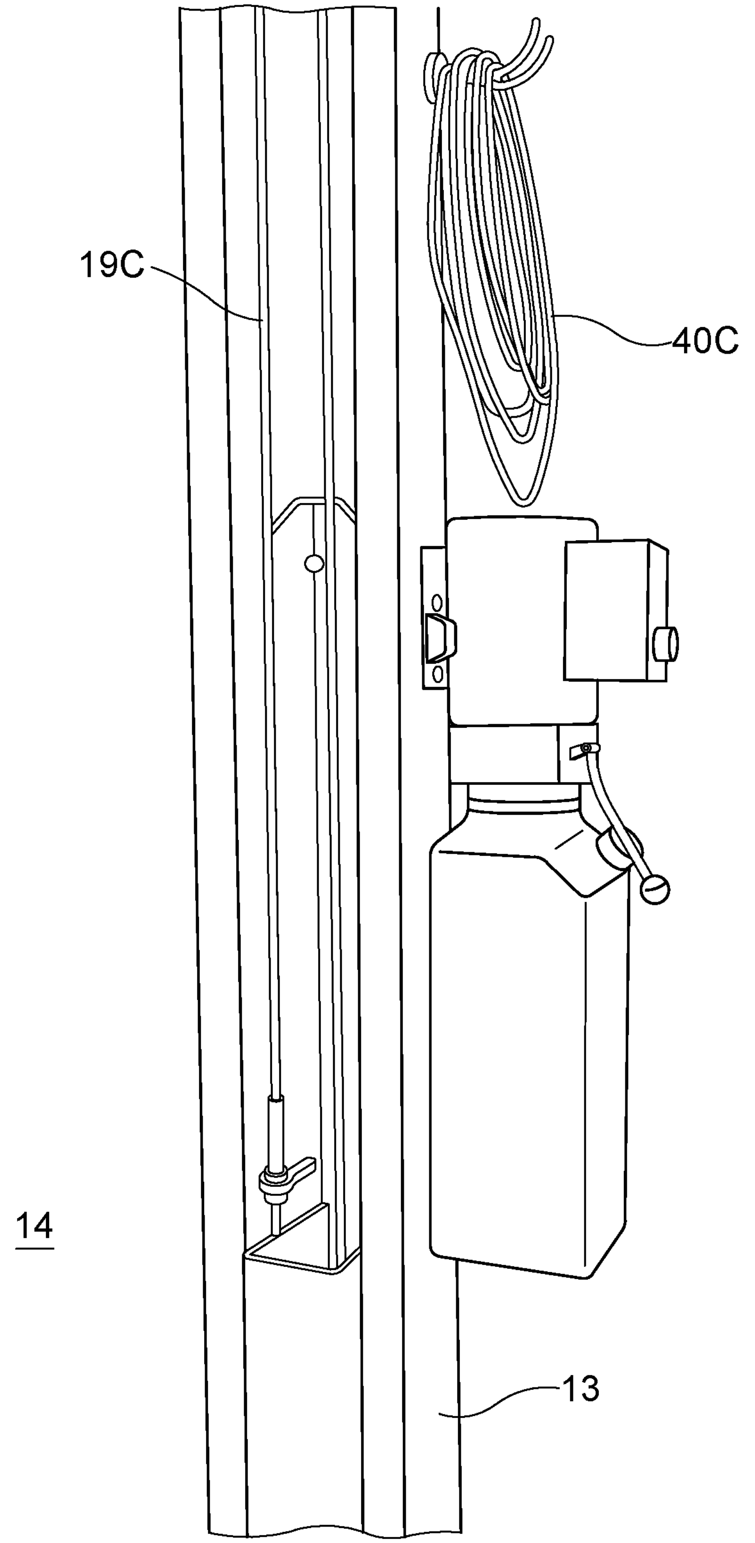
FIG. 5 illustrates a left side of the second substantially vertical support and illustrating the chain drive positioned within the second substantially vertical support for raising the second vertical lift.
Figure 6:
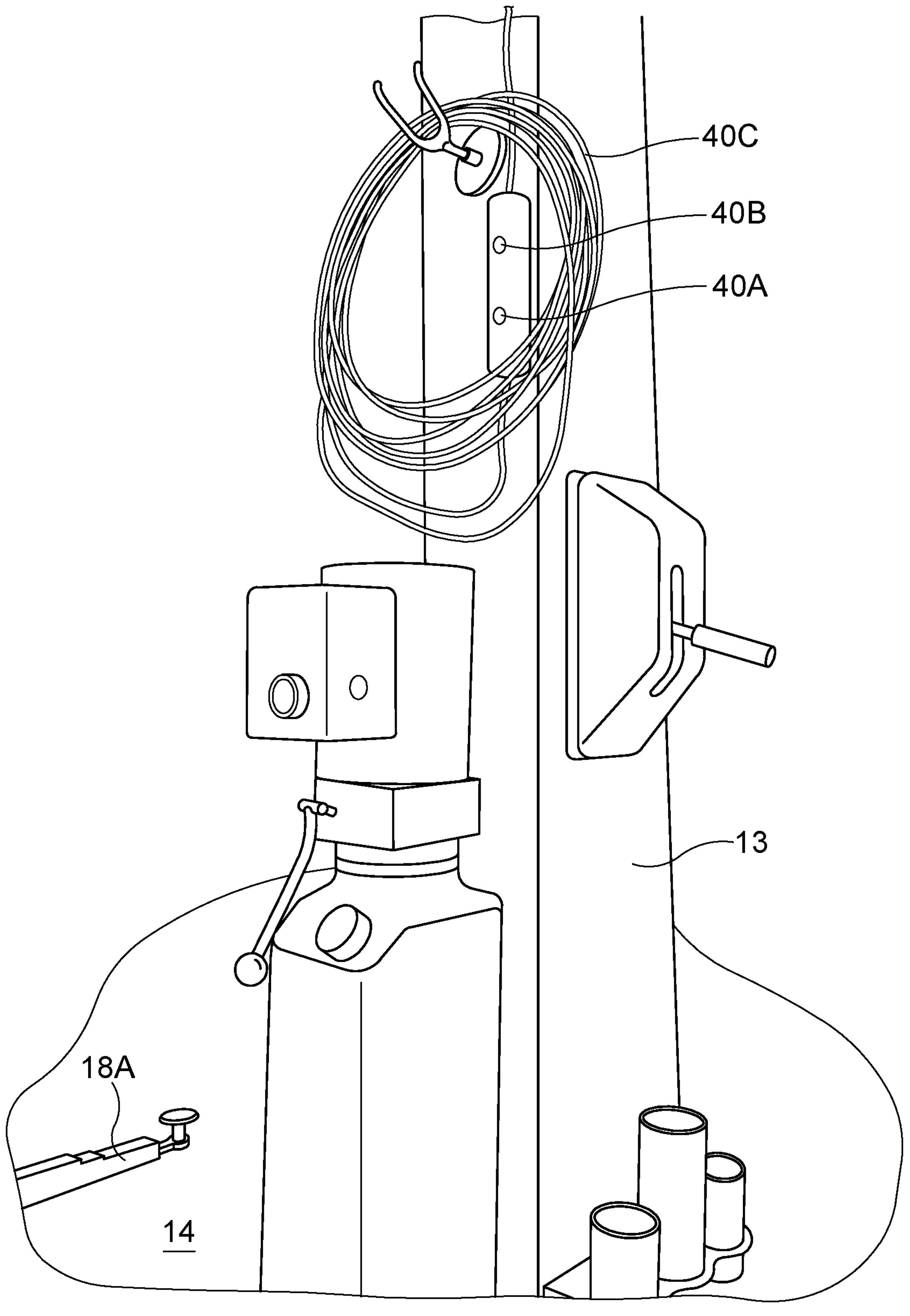
FIG. 6 illustrates a right side of the second substantially vertical support with the lever to operate the hoist imparting movement to the chain drives positioned within the first and second substantially vertical supports for raising the first and second vertical lifts.

FIG. 5 illustrates a left side perspective view of the second substantially vertical support 13 that includes the chain drive 19C positioned within the second substantially vertical support 13 for raising the second vertical lift 19. FIG. 6 illustrates a right side perspective view of the second substantially vertical support 13 with the lever 30 to operate the hoist for imparting movement to the chains drives 18C, 19C for raising the first and second vertical lifts 18, 19 to raise and subsequently lower a vehicle. The winch rope, lift rope, cable, chain or the like 26 may be lowered by actuating the button 40A for securing to an engine. Thereafter, the button 40B may be actuated for pulling or hoisting the engine upwardly and away from the chassis of the vehicle. The button 40A and 40B are operatively connected to the winch 22 by the cable 40C. The cable 40C permits an individual to be at any position relative to the vehicle and the engine during operation of the hoist 10. For example, an individual may be under the vehicle removing the bolts to disconnect the engine from the vehicle or to install the bolts to reconnect the engine with the vehicle while actuating the buttons 40A and 40B to align the engine with the vehicle.

Figure 7:
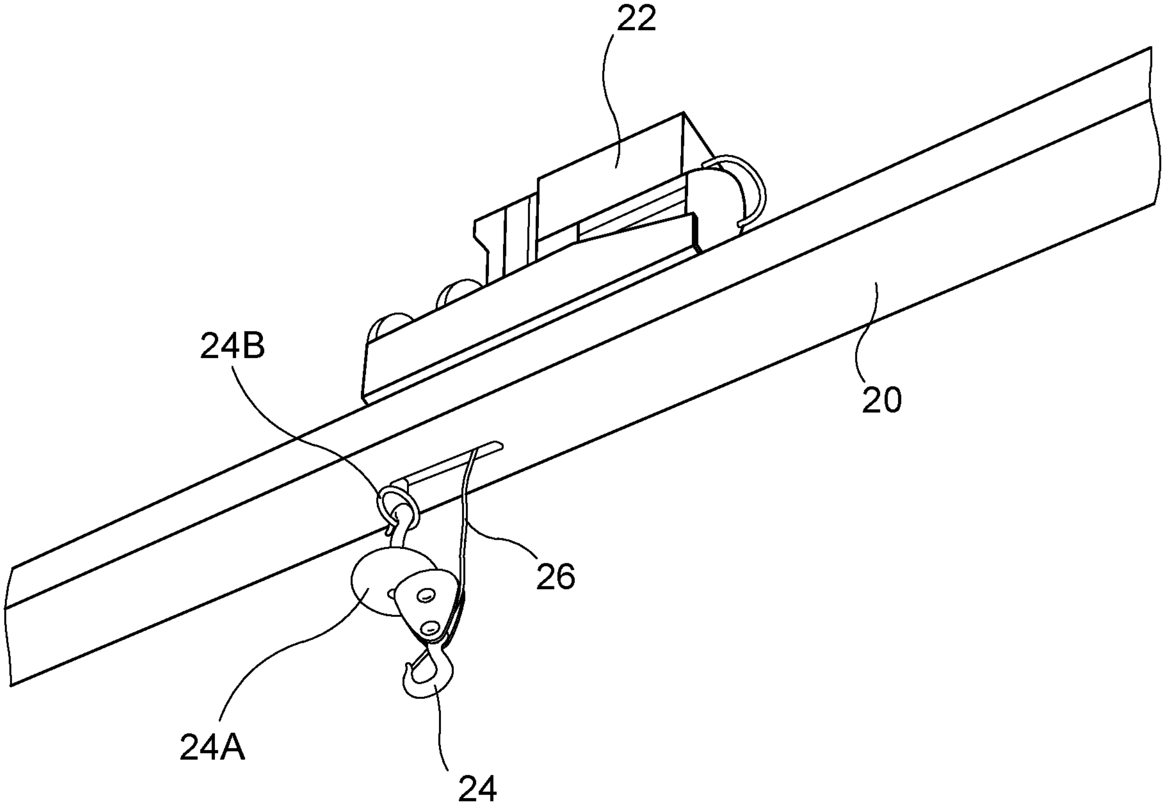
FIG. 7 illustrates a substantially horizontal member that is connected to upper surfaces of the first and second substantially vertical supports with a winch positioned on an upper surface of the substantially horizontal member.

FIG. 7 illustrates the substantially horizontal member 20 that is connected to upper surfaces 16, 15 of the first and second substantially vertical supports 12, 13. The winch 22 is positioned on an upper surface of the substantially horizontal member 20. The winch rope, lift rope, cable, chain or the like 26 includes a first end connected to the winch 22 and a second end connected to the hook 24A that is connected to an eyelet 24B secured to the substantially horizontal member 20. The hook 24 includes a pulley 24C that is in engagement with the winch rope, lift rope, cable, chain or the like 26. The first end of the winch rope, lift rope, cable, chain or the like 26 that is connected to the winch 22 can be extended and wound up by the actuating the winch 22. The second end connected to the hook 24A that is connected to an eyelet 24B enables the hook 24 to lift twice the amount of weight in view of the fact that the winch rope, lift rope, cable, chain or the like 26 is looped to extend downwardly to permit the hook 24 to be attached to an engine while the second end is attached to the hook 24A secured to the substantially horizontal member 20.

Figure 8:
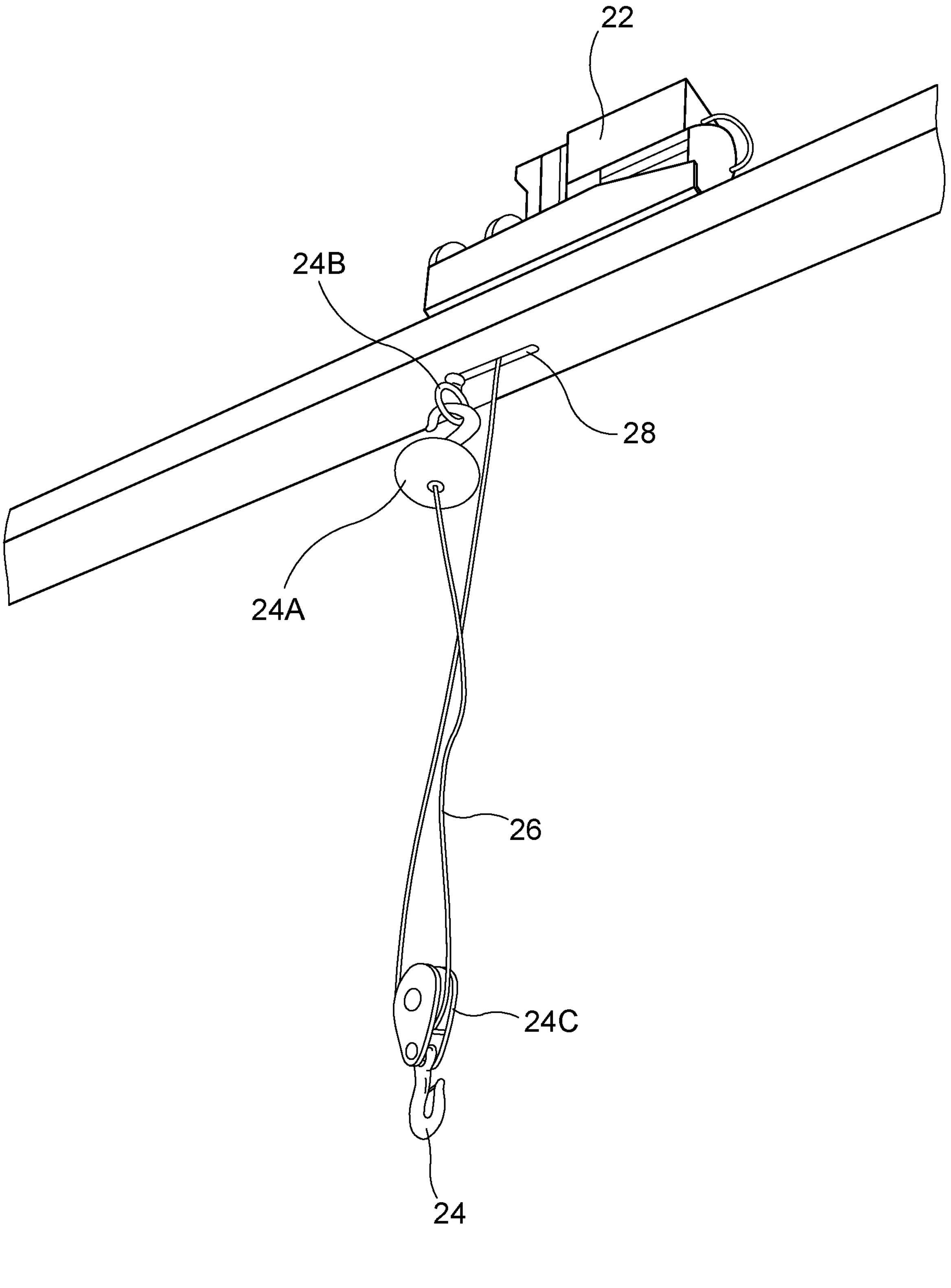
FIG. 8 illustrates the substantially horizontal member that is connected to the upper surfaces of the first and second substantially vertical supports with an slot being formed in the substantially horizontal member wherein the winch positioned on an upper surface of the substantially horizontal member may be moved from one side adjacent to the first substantially vertical support to the other side adjacent to the second substantially vertical support to accommodate various objects to be lifted relative to a vehicle.
Figure 12:
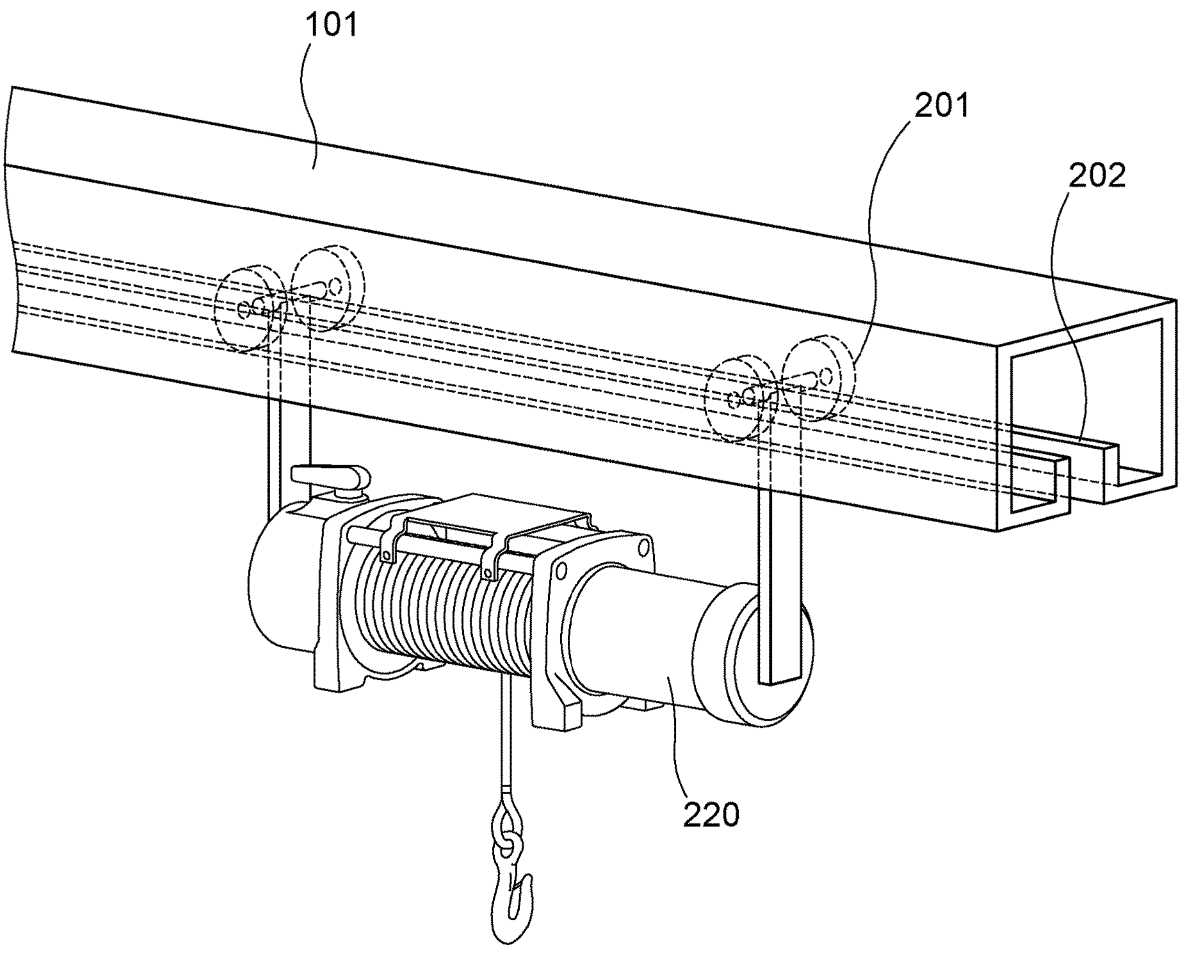
FIG. 12 is an enlarged view of another embodiment wherein the substantially horizontal member is formed of an I-beam with wheels positioned within the flange members of the I-beam and the winch being supported beneath the I-beam.

FIG. 8 illustrates the substantially horizontal member 20 with a slot 28 formed in the substantially horizontal member 20. The slot 28 is formed to extend from the first substantially vertical support 12 to the second substantially vertical support 13. The slot 28 formed in the substantially horizontal member permits the winch to be moved on the upper surface of the substantially horizontal member 20 from one side adjacent to the first substantially vertical support 12 to the other side adjacent to the second substantially vertical support 13. A motor may be secured to the winch 22 to move the winch 22 from one side to the other depending on the article that an individual wishes to work on relative to a vehicle. For example, if an individual wishes to work on an engine, an individual would position the winch 22 approximately in the center of the substantially horizontal member 20. If an individual wishes to work on door of a vehicle, an individual would position the winch 22 to either be adjacent to the first substantially vertical support 12 or adjacent to the second substantially vertical support 13 depending on the door of the vehicle that an individual wishes to work on. The slot 28 may extend the entire length of the substantially horizontal support 20 or may extend only along a portion of the substantially horizontal support 20. FIG. 12 is an enlarged view of another embodiment wherein the substantially horizontal member is formed of an I-beam 101 with wheels 201 positioned within the flange members 102 of the I-beam 101 and the winch 220 being supported beneath the I-beam 101.

FIG. 9 is a side view of the hoist 10 in use together with a vehicle 50 wherein a hood of the vehicle 50 has been removed. The winch 22 is used to thereafter remove an engine 51 from the vehicle. FIG. 10 is a front view of the hoist 10 in use together with the vehicle 50 with the hood of the vehicle 50 being removed and the engine 51 is lifted from the vehicle 50 by the winch 22. FIG. 11 is a side view of the hoist 10 in use together with the vehicle 50 with the hood of the vehicle 50 being removed and the engine 51 being removed from the vehicle 50 by the winch 22. FIGS. 9-11 also illustrate the substantially horizontal member 20 that is connected to upper surfaces 16, 15 of the first and second substantially vertical supports 12, 13. The winch 22 is positioned on an upper surface of the substantially horizontal member 20. The winch rope, lift rope, cable, chain or the like 26 includes the first end connected to the winch 22 and a second end connected to the hook 24A that is connected to the eyelet 24B secured to the substantially horizontal member 20. The hook 24 includes a pulley 24C that is in engagement with the winch rope, lift rope, cable, chain or the like 26. Again, as the first end of the winch rope, lift rope, cable, chain or the like 26 that is connected to the winch 22 is extended the hook 24A may be secured to an engine 51. As the first end of the winch rope, lift rope, cable, chain or the like 26 is wound up by the actuating the winch 22 the engine 51 may be removed from the vehicle 50. After the engine 51 is removed from the vehicle 50, the vehicle 50 may be pushed back and away from the hoist 10 to permit an individual to position the engine 51 on a movable workbench for working on the engine 51. FIG. 12 is an enlarged view of another embodiment wherein the substantially horizontal member is formed of an I-beam 101 with wheels 201 positioned within the flange members 202 of the I-beam 101 and the winch 220 being supported beneath the I-beam 101. In addition, the wheels may be locked to permit the winch 220 to be positioned along the length of the I-beam 101 at any predetermined location.

The hoist 10 is designed to be used in conjunction with an automobile or a truck for removing an engine from the automobile or truck.

Although the present invention has been described to include the buttons 40A and 40B that are connected to the cable 40C to operate the winch 22, an embodiment of the present invention includes a remote control switch that would eliminate the need to use the cable 40C. The remote control switch would permit an individual to be at any position relative to the vehicle and the engine during operation of the hoist 10. For example, an individual may be under the vehicle removing the bolts to disconnect the engine from the vehicle or to install the bolts to reconnect the engine with the vehicle while actuating the remote control switch to lift or lower the engine to permit alignment of the engine with the vehicle.

In addition the present invention is not limited to just lifting and installing engines but can lift a multitude of heavy objects example lifting: transmissions to and from transmission jacks, windows for installation in vehicles, doors for installation in vehicles, auto bodies and truck beds from vehicle chaises, and many more applications needed for completing heavy tasks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hoist for removing an automotive object selected from the group consisting of an engine, a transmission, a truck bed, a hood, a door and any automotive part to enable a single automotive technician to be able to lift and work on the engine, transmission, truck bed, hood, door or any automotive part comprising:

a first substantially vertical support fixed to a floor surface, said first substantially vertical support extending upwardly a predetermined distance to an upper surface;

a second substantially vertical support fixed to the floor surface, said second substantially vertical support being spaced laterally a predetermined distance relative to the first substantially vertical support, the second substantially vertical support extending upwardly a predetermined distance to an upper surface;

a substantially horizontal member extending across from said upper surface of the first substantially vertical support to said upper surface of the second substantially vertical support;

a first vertical lift being operatively positioned within said first substantially vertical support;

a second vertical lift being operatively positioned within said second substantially vertical support;

said first vertical lift and said second vertical lift being selectively actuated for raising a vehicle relative to the floor surface;

said hoist being operatively mounted on the substantially horizontal member for lifting and lowering the engine, transmission, truck bed, hood, door or any automotive part relative to the vehicle after the engine, transmission, truck bed, hood, door or any automotive part has been disengaged from the vehicle; and a controller for controlling the operation of the hoist for lifting and lowering the engine, transmission, truck bed, hood, door or any automotive part, said controller being operatively connected to an elongated cable for enabling the single automotive technician to be at any position relative to the engine, transmission, truck bed, hood, door or any automotive part while enabling the single automotive technician to adjust the lifting and lowering of the engine, transmission, truck bed, hood, door or any automotive part relative to the vehicle to enable the single automotive technician to actuate the hoist while remaining in any position relative to the engine, transmission, truck bed, hood, door or any automotive part until the engine, transmission, truck bed, hood, door or any automotive part is disengaged from the vehicle, thereafter the single automotive technician is able to work on the engine, transmission, truck bed, hood, door or any automotive part;

wherein the substantially horizontal member includes a slot extending across a portion of the substantially horizontal member to enable the hoist to be moved from one side of the substantially horizontal member to the other.

2. The hoist according to claim 1, wherein the vehicle is selected from the group consisting of an automobile, a light ½ ton truck, a medium ¾ ton truck, a super heavy duty 1 ton truck and a van.

3. The hoist according to claim 2, and further including first supports secured to the first vertical lift for positioning underneath a left side of the automobile, light ½ ton truck, medium ¾ ton truck, super heavy duty 1 ton truck or van and second supports secured to the second vertical lift for positioning underneath a right side of the automobile, light ½ ton truck, medium ¾ ton truck, super heavy duty 1 ton truck or van for selectively elevating the automobile, light ½ ton truck, medium ¾ ton truck, super heavy duty 1 ton truck or van relative to the floor surface.

4. A hoist for removing an engine, transmission, truck bed, hood, door or any automotive part to enable a single automotive technician to work on the engine, transmission, truck bed, hood, door or any automotive part comprising:

a first substantially vertical support fixed to a floor surface, said first substantially vertical support extending upwardly a predetermined distance to an upper surface;

a second substantially vertical support fixed to the floor surface, said second substantially vertical support being laterally spaced a predetermined distance relative to the first substantially vertical support, the second substantially vertical support extending upwardly a predetermined distance to an upper surface;

a substantially horizontal member extending across from said upper surface of the first substantially vertical support to said upper surface of the second substantially vertical support;

a first vertical lift being operatively positioned within said first substantially vertical support;

a second vertical lift being operatively positioned within said second substantially vertical support;

said first vertical lift and said second vertical lift being selectively actuated for raising a vehicle relative to the floor surface;

said hoist being operatively mounted on the substantially horizontal member for lifting the engine, transmission, truck bed, hood, door or any automotive part relative to the vehicle after the engine, transmission, truck bed, hood, door or any automotive part has been disengaged from the vehicle; and a controller for controlling the actuation of the hoist for lifting and lowering the engine, transmission, truck bed, hood, door or any automotive part, said controller being operatively connected by remote control for enabling the single automotive technician to be at any position relative to the engine, transmission, truck bed or door for enabling the single automotive technician to operate the lifting and lowering of the engine, transmission, truck bed, hood, door or any automotive part relative to the vehicle to enable the single automotive technician to actuate the hoist while remaining in any position relative to the engine, transmission, truck bed, hood, door or any automotive part until the engine, transmission, truck bed, hood, door or any automotive part is disengaged from the vehicle, thereafter the single automotive technician is able to work on the engine, transmission, truck bed, hood, door or automotive part;

wherein the substantially horizontal member includes a slot extending across a portion of the substantially horizontal member to enable the hoist to be moved from one side of the substantially horizontal member to the other.

5. The hoist according to claim 4, wherein the vehicle is selected from the group consisting of an automobile, a light ½ ton truck, a medium ¾ ton truck, a super heavy duty 1 ton truck and a van.

6. The hoist according to claim 5, and further including first supports secured to the first vertical lift for positioning underneath a left side of the automobile, light ½ ton truck, medium ¾ ton truck, super heavy duty 1 ton truck or van and second supports secured to the second vertical lift for positioning underneath a right side of the automobile, light ½ ton truck, medium ¾ ton truck, super heavy duty 1 ton truck or van for selectively elevating the automobile, light ½ ton truck, medium ¾ ton truck, super heavy duty 1 ton truck or van relative to the floor surface.

7. A hoist for removing an automotive object selected from the group consisting of an engine, a transmission, a truck bed, a hood, a door and any automotive part to enable a single automotive technician to be able to lift and work on the engine, transmission, truck bed, hood, door or any automotive part comprising:

a first substantially vertical support fixed to a floor surface, said first substantially vertical support extending upwardly a predetermined distance to an upper surface;

a second substantially vertical support fixed to the floor surface, said second substantially vertical support being spaced laterally a predetermined distance relative to the first substantially vertical support, the second substantially vertical support extending upwardly a predetermined distance to an upper surface;

a substantially horizontal member extending across from said upper surface of the first substantially vertical support to said upper surface of the second substantially vertical support;

a first vertical lift being operatively positioned within said first substantially vertical support;

a second vertical lift being operatively positioned within said second substantially vertical support;

said first vertical lift and said second vertical lift being selectively actuated for raising a vehicle relative to the floor surface;

said hoist being operatively mounted on the substantially horizontal member for lifting and lowering the engine, transmission, truck bed, hood, door or any automotive part relative to the vehicle after the engine, transmission, truck bed, hood, door or any automotive part has been disengaged from the vehicle; and a controller for controlling the operation of the hoist for lifting and lowering the engine, transmission, truck bed, hood, door or any automotive part, said controller being operatively connected to an elongated cable for enabling the single automotive technician to be at any position relative to the engine, transmission, truck bed, hood, door or any automotive part while enabling the single automotive technician to adjust the lifting and lowering of the engine, transmission, truck bed, hood, door or any automotive part relative to the vehicle to enable the single automotive technician to actuate the hoist while remaining in any position relative to the engine, transmission, truck bed, hood, door or any automotive part until the engine, transmission, truck bed, hood, door or any automotive part is disengaged from the vehicle, thereafter the single automotive technician is able to work on the engine, transmission, truck bed, hood, door or any automotive part;

wherein the substantially horizontal member is an I-beam extending across the substantially horizontal member and further including wheels for mounting the hoist relative to the I-beam to enable the hoist to be selectively moved from one side of the substantially horizontal member to the other.

8. The hoist according to claim 7, wherein the vehicle is selected from the group consisting of an automobile, a light ½ ton truck, a medium ¾ ton truck, a super heavy duty 1 ton truck and a van.

9. The hoist according to claim 8, and further including first supports secured to the first vertical lift for positioning underneath a left side of the automobile, light ½ ton truck, medium ¾ ton truck, super heavy duty 1 ton truck or van and second supports secured to the second vertical lift for positioning underneath a right side of the automobile, light ½ ton truck, medium ¾ ton truck, super heavy duty 1 ton truck or van for selectively elevating the automobile, light ½ ton truck, medium ¾ ton truck, super heavy duty 1 ton truck or van relative to the floor surface.

10. A hoist for removing an engine, transmission, truck bed, hood, door or any automotive part to enable a single automotive technician to work on the engine, transmission, truck bed, hood, door or any automotive part comprising:

a first substantially vertical support fixed to a floor surface, said first substantially vertical support extending upwardly a predetermined distance to an upper surface;

a second substantially vertical support fixed to the floor surface, said second substantially vertical support being laterally spaced a predetermined distance relative to the first substantially vertical support, the second substantially vertical support extending upwardly a predetermined distance to an upper surface;

a substantially horizontal member extending across from said upper surface of the first substantially vertical support to said upper surface of the second substantially vertical support;

a first vertical lift being operatively positioned within said first substantially vertical support;

a second vertical lift being operatively positioned within said second substantially vertical support;

said first vertical lift and said second vertical lift being selectively actuated for raising a vehicle relative to the floor surface;

said hoist being operatively mounted on the substantially horizontal member for lifting the engine, transmission, truck bed, hood, door or any automotive part relative to the vehicle after the engine, transmission, truck bed, hood, door or any automotive part has been disengaged from the vehicle; and a controller for controlling the actuation of the hoist for lifting and lowering the engine, transmission, truck bed, hood, door or any automotive part, said controller being operatively connected by remote control for enabling the single automotive technician to be at any position relative to the engine, transmission, truck bed or door for enabling the single automotive technician to operate the lifting and lowering of the engine, transmission, truck bed, hood, door or any automotive part relative to the vehicle to enable the single automotive technician to actuate the hoist while remaining in any position relative to the engine, transmission, truck bed, hood, door or any automotive part until the engine, transmission, truck bed, hood, door or any automotive part is disengaged from the vehicle, thereafter the single automotive technician is able to work on the engine, transmission, truck bed, hood, door or automotive part;

wherein the substantially horizontal member is an I-beam extending across the substantially horizontal member and further including wheels for mounting the hoist relative to the I-beam to enable the hoist to be selectively moved from one side of the substantially horizontal member to the other.

11. The hoist according to claim 10, wherein the vehicle is selected from the group consisting of an automobile, a light ½ ton truck, a medium ¾ ton truck, a super heavy duty 1 ton truck and a van.

12. The hoist according to claim 11, and further including first supports secured to the first vertical lift for positioning underneath a left side of the automobile, light ½ ton truck, medium ¾ ton truck, super heavy duty 1 ton truck or van and second supports secured to the second vertical lift for positioning underneath a right side of the automobile, light ½ ton truck, medium ¾ ton truck, super heavy duty 1 ton truck or van for selectively elevating the automobile, light ½ ton truck, medium ¾ ton truck, super heavy duty 1 ton truck or van relative to the floor surface.

* * * * *